United States Patent
Wu et al.

(10) Patent No.: US 9,451,242 B2
(45) Date of Patent: Sep. 20, 2016

(54) APPARATUS FOR ADJUSTING DISPLAYED PICTURE, DISPLAY APPARATUS AND DISPLAY METHOD

(71) Applicant: BOE TECHNOLOGY GROUP CO., LTD., Beijing (CN)

(72) Inventors: Yanbing Wu, Beijing (CN); Yanshun Chen, Beijing (CN); Youmei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 452 days.

(21) Appl. No.: 13/970,827

(22) Filed: Aug. 20, 2013

(65) Prior Publication Data
US 2014/0055578 A1 Feb. 27, 2014

(30) Foreign Application Priority Data
Aug. 21, 2012 (CN) .......................... 2012 1 0299615

(51) Int. Cl.
*H04N 13/04* (2006.01)
*H04N 5/262* (2006.01)
(Continued)

(52) U.S. Cl.
CPC ........... *H04N 13/0402* (2013.01); *G06F 3/011* (2013.01); *G06F 3/013* (2013.01); *G06F 3/0484* (2013.01); *H04N 5/2628* (2013.01);
(Continued)

(58) Field of Classification Search
CPC ...................... H04N 13/0402; H04N 13/0484; H04N 13/0022; H04N 13/0018; H04N 13/0468; H04N 5/2628; H04N 13/04; G06F 3/013; G06F 3/011; G06F 3/0484; G06F 2203/04806

USPC ..................................................... 348/51, 42
See application file for complete search history.

(56) References Cited

U.S. PATENT DOCUMENTS

2010/0182232 A1* 7/2010 Zamoyski ............... G06F 3/013
345/157
2012/0060177 A1  3/2012 Stinson, III et al.
(Continued)

FOREIGN PATENT DOCUMENTS

CN      101751209 A     6/2010
CN      102075776 A     5/2011
(Continued)

OTHER PUBLICATIONS

Extended European Search Report Appln. No. 13181033.5-1902/2701390; Dated Aug. 14, 2015.
(Continued)

*Primary Examiner* — Allen Wong
(74) *Attorney, Agent, or Firm* — Ladas & Parry LLP (57) ABSTRACT

Embodiments of the present disclosure provide an apparatus for adjusting displayed picture, comprising a video signal input means, a position measuring means, an image processing means and a video signal output means. Embodiments of the present disclosure further provide a display apparatus comprising the above apparatus for adjusting the displayed picture and a display method thereof. In the embodiments of the present disclosure, a position being concerned by viewer's eyes on the display screen is enlarged or a field depth of the position being concerned by the eyes on the display screen is increased when the viewer moves forward or tilts his/her body forward, such that the viewer can view the displayed picture more clearly, thus achieving an interaction between the displayed picture and the viewer.

24 Claims, 4 Drawing Sheets

(51) Int. Cl.
 H04N 13/00 (2006.01)
 G06F 3/01 (2006.01)
 G06F 3/0484 (2013.01)
(52) U.S. Cl.
 CPC ...... H04N13/0018 (2013.01); H04N 13/0022 (2013.01); H04N 13/04 (2013.01); H04N 13/0468 (2013.01); H04N 13/0484 (2013.01); G06F 2203/04806 (2013.01)

(56) References Cited

U.S. PATENT DOCUMENTS

2012/0083312 A1* 4/2012 Kim .................. G02B 13/001
 455/556.1
2012/0113107 A1 5/2012 Jang

FOREIGN PATENT DOCUMENTS

| CN | 102457755 A | 5/2012 | |
|---|---|---|---|
| EP | 2393300 A2 * | 12/2011 | ......... H04N 13/0022 |
| EP | 2405664 A2 * | 1/2012 | ......... H04N 13/0022 |
| EP | 2439611 A1 | 4/2012 | |
| EP | 2453342 A2 | 5/2012 | |
| WO | 2007138394 A1 | 12/2007 | |

OTHER PUBLICATIONS

Second Chinese Office Action Appln. No. 201210299615.X; Dated Oct. 8, 2014.
First Chinese Office Action dated May 6, 2014; Appln. No. 201210299615.X.

* cited by examiner

APPARATUS FOR ADJUSTING DISPLAYED PICTURE, DISPLAY APPARATUS AND DISPLAY METHOD

FIELD OF THE DISCLOSURE

The present disclosure relates to a field of displaying technology, and particularly to an apparatus for adjusting displayed pictures, a display apparatus and a display method.

BACKGROUND

When a viewer is viewing an object, the viewer often goes ahead one or more steps or tilts his/her body forward to view some details more clearly since such details are small. Similarly, when the viewer is watching a movie or a television program, the viewer may also tilt his/her body forward or moves forward by a certain distance when some objects are displayed on a display screen and the viewer intends to view the objects more clearly. However, some details cannot be viewed clearly even if the viewer moves forward by the certain distance or tilts his/her body forward, since the details are too small or a definition of the displayed picture is too low.

In existing displaying technologies, no matter in a 2D display or in a 3D display technology, when the viewer moves forward by the certain distance or tilts his/her body forward, there is not an interaction function for enlarging details desired by the viewer, thus ambience of the viewer being weak.

SUMMARY

Technical problem to be solved by the present disclosure is: how to adjust a displayed picture according to actions of a viewer so as to make the viewer watch more clearly.

In order to solve the above technical problem, one embodiment of the present disclosure provides an apparatus for adjusting a displayed picture, comprising a video signal input means, a position measuring means, an image processing means and a video signal output means, wherein the video signal input means, the position measuring means and the video signal output means are all connected to the image processing means;

the video signal input means is used for transmitting an acquired video signal to the image processing means;

the position measuring means transmits position information of a viewer with respect to a display screen, collected before and after a change in position of the viewer, to the image processing means;

the image processing means adjusts the video signal according to the position information before and after the change in position of the viewer to enlarge an image in the video signal, and transmits the adjusted video signal to the video signal output means.

In an example, the apparatus for adjusting a displayed picture further comprises an eye tracker for detecting information of position being concerned by eyes on the display screen and transmitting the information of position being concerned to the image processing means.

In an example, the image processing means comprises:

an image enlarging module for enlarging a partial image at the position being concerned in the video signal according to the position information before and after the change in position of the viewer and transmitting a picture having the partial image enlarged to a video signal generating module; and the video signal generating module for generating a new video signal according to the picture having the partial image enlarged and transmitting the new video signal to the video signal output means.

In an example, the image processing means comprises:

a left/right eye view enlarging module for enlarging partial images at the position being concerned in left/right eye views in a 3D video signal according to the position information before and after the change in position of the viewer and transmitting the left/right eye view having the partial images enlarged to a 3D video signal generating module; and the 3D video signal generating module for generating a new 3D video signal according to the left/right eye view having the partial images enlarged and transmitting the new 3D video signal to the video signal output means.

In an example, the image processing means further comprises a left/right eye view extracting module for receiving the 3D video signal and transmitting left/right eye views extracted from the 3D video signal to the left/right eye view adjusting module.

In an example, the left/right eye view extracting module comprises:

a sampling sub module for sampling a frame of data in the 3D video signal and transmitting the frame of data to a splitting sub module;

the splitting sub module for splitting left/right eye views from the frame of data and transmitting the split left/right eye views to the left/right eye view enlarging module.

In an example, the image processing means comprises:

a field depth adjusting module for adjusting distance for respective pixel dots corresponding to the position being concerned in the left/right eye views in the 3D video signal according to the position information before and after the change in position of the viewer so as to increase the field depth of the position being concerned, and transmitting the adjusted left/right eye views to a 3D video signal generating module;

the 3D video signal generating module for generating a new 3D video signal according to the adjusted left/right eye views and transmitting the new 3D video signal to the video signal output means.

In an example, the image processing means further comprises a left/right eye view extracting module for receiving the 3D video signal and transmitting left/right eye views extracted from the 3D video signal to the field depth adjusting module.

In an example, the left/right eye view extracting module comprises:

a sampling sub module for sampling a frame of data in the 3D video signal and transmitting the frame of data to a splitting sub module;

the splitting sub module for splitting left/right eye views from the frame of data and transmitting the split left/right eye views to the field depth adjusting module.

In an example, the image processing means further comprises a boundary judging module for adjusting the enlarged partial image to be in a display area of the display screen when the enlarged partial image exceeds a boundary of the display screen and transmitting a picture having the position adjusted to the video signal generating module.

In an example, the image processing means further comprises an image restoring module for receiving the video signal input from the video signal input means, judging a similarity between pictures of two adjacent frames in real time, and transmitting a signal indicating stopping enlarging to the image enlarging module when the similarity is lower than a predetermined threshold, and the image enlarging module transmits the video signal to the video signal output means directly as it was.

In an example, the position measuring means comprises a camera, an infrared sensor or means for inputting position information manually.

Embodiments of the present disclosure further provide a display apparatus comprising a display screen and the apparatus for adjusting a displayed picture according to any one of the above description, the video signal output means of the apparatus for adjusting a displayed picture is connected to the display screen and transmits the adjusted video signal to the display screen for display.

In an example, the display screen comprises a shutter glass 3D display screen, a pattern retarder 3D display screen, a Parallax barrier 3D display screen, a lenticular 3D display screen, or a directional backlight 3D display screen.

Embodiments of the present disclosure further provide a display method comprising the following steps:

step S1, collecting, in real time, position information of a viewer with respect to a display screen before and after a change in position of the viewer and acquiring a picture in a video signal;

step S2, enlarging the image of the picture in the video signal according to the position information;

step S3, generating a new video signal according to the enlarged image and displaying the same on the display screen.

In an example, the step S1 further comprises acquiring information of position being concerned by eyes of the viewer on the display screen when the change in position of the viewer appears.

In an example, in the step S1, the position information of the viewer with respect to the display screen is collected by means of a camera, an infrared sensor or means for inputting position information manually, and the information of position being concerned by eyes of the viewer on the display screen is collected by means of an eye tracker.

In an example, in the step S1, a data collecting rate for collecting position change of the viewer is 55 Hz~65 Hz.

In an example, the video signal is a 2D video signal, and in the step S2, an enlarging factor is calculated by a following equation according to the position information, and a partial image at the position being concerned in the picture in the video signal is enlarged by the enlarging factor, $$A = k \cdot D1/D2$$

wherein, A is an enlarging factor, k is an enlarging coefficient and is a constant larger than 0, D1 represents a distance of the viewer with respect to the display screen before the change in position of the viewer, D2 represents a distance of the viewer with respect to the display screen after the change in position of the viewer.

In an example, the video signal is a 3D video signal, and in the step S2, an enlarging factor is calculated by a following equation according to the position information, and partial images at the position being concerned in left/right eye views in the 3D video signal are enlarged by the enlarging factor, respectively, $$A = k \cdot D1/D2$$

wherein, A is an enlarging factor, k is an enlarging coefficient and is a constant larger than 1, D1 represents a distance of the viewer with respect to the display screen before the change in position of the viewer, D2 represents a distance of the viewer with respect to the display screen after the change in position of the viewer.

In an example, the video signal is a 3D video signal, and in the step S2, distance for the respective pixel dots corresponding to the position being concerned in the left/right eye views in the 3D video signal are adjusted by a following equation according to the position information, such that a field depth of the position being concerned is increased, $$L2 = L1 \cdot f \cdot D1/D2$$
$$M = \frac{S \cdot L2}{D2 - L2}$$

wherein, D1 represents a distance of the viewer with respect to the display screen before the change in position of the viewer, D2 represents a distance of the viewer with respect to the display screen after the change in position of the viewer, L1 represents the field depth before the change in position of the viewer, D2 represents the field depth after the change in position of the viewer, f is an enlarging coefficient and is a constant larger than 1, M is a distance for the respective pixel dots when the left/right eye views are displayed on the display screen after the change in position of the viewer, S is a pupil distance of the viewer.

In an example, when the left/right eye views in the 3D video signal are transmitted in a form of same pictures, acquiring the picture in the video signal in the step S1 is a step of acquiring the left/right eye views in the 3D video signal and further comprises:

collecting a frame of data in the 3D video signal; and splitting the left/right eye views from the frame of data.

In an example, after enlarging the partial image at the position being concerned in step S2, the method further comprises judging whether the enlarged partial image exceeds a boundary of the display screen; and adjusting the enlarged partial image to be in a display area of the display screen when it is judged that the enlarged partial image exceeds the boundary of the display screen.

In an example, after the step S3, the method further comprises judging a similarity between pictures of two adjacent frames, stopping enlarging the image of the picture when the similarity is lower than a predetermined threshold, and transmitting the video signal directly to the display screen for display as it was.

With the embodiments of the present disclosure, when the viewer moves forward or tilts his/her body forward, a visual area on the screen being concerned by eyes of the viewers is enlarged or has a deeper field depth correspondingly, such that details may be viewed by the viewer more clearly, and thus achieving an interaction between the displayed picture and the viewer.

DETAILED DESCRIPTION

In order to make the technical solutions of embodiments of the present disclosure to be understood by those skilled in the art thoroughly, descriptions will be made in detail, taken in conjunction with the accompanying drawings and particular implementations. The following embodiments are merely used to describe the present disclosure, and should have no limitation on the scope of the present disclosure.

First Embodiment

Figure 1:
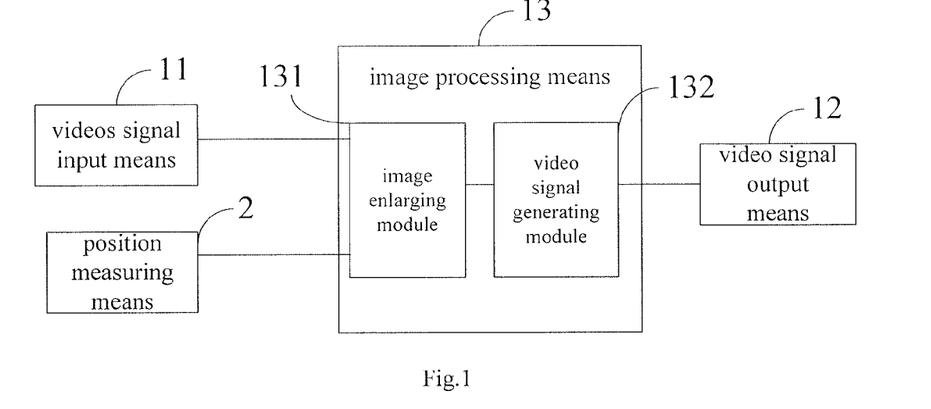
FIG. 1 is a schematic diagram of a structure of an apparatus for adjusting a displayed picture according to a first embodiment of the present disclosure.

A structure of an apparatus for adjusting a displayed picture of the present embodiment is as shown in FIG. 1, the apparatus for adjusting the displayed picture of the present embodiment comprises a video signal input means 11, a position measuring means 2, an image processing means 13 and a video signal output means 12. The video signal input means 11, the position measuring means 2 and the video signal output means 12 are all connected to the image processing means 13.

The video signal input means 11 transmits an acquired video signal to the image processing means 13. The video signal input means 11 may be transmission interfaces of various types capable of transmitting 2D video signals or 3D video signals.

The position measuring means 2 transmits position information of a viewer with respect to a display screen collected before and after a change in position of the viewer (the viewer moves forward or tilts his/her body forward, taking the position of the head of the viewer as a measurement) to the image processing means 13. The data collecting rate is generally at 55~65 Hz, that is, about 60 Hz. In the present embodiment, the position measuring means 2 comprises but is not limited to a camera, an infrared sensor or means for inputting position information manually. Wherein, the position information before and after the change in position of the viewer may be coordinates of the viewer and the display screen under the current space coordinate system, and may also be distances between the viewer and the display screen. For example, the camera collects position coordinates of the viewer and the display screen under the space coordinate system, and transmits data of the position coordinates to the image processing means 13; or an operation module in the camera calculates the distances between the viewer and the display screen according to the position coordinates of the viewer and the display screen under the space coordinate system, and transmits data of the distances to the image processing means 13.

The image processing means 13 enlarges images of the video signal according to the position information before and after the change in position of the viewer, and transmits the video signal having the image enlarged to the video signal output means 12, wherein the enlarging is usually performed by taking the picture center as a reference. The video signal output means 12 may be transmission interfaces of various types capable of transmitting 2D video signals or 3D video signals.

In the present embodiment, the image processing means 13 may be an embedded chip system composed of a MCU, a FPGA, a PLCD and the like. The image processing means 13 may particularly comprise an image enlarging module 131 and a 2D video signal generating module 132.

An image enlarging module 131 enlarges the image of the video signal (the video signal comprises the image to be displayed per se and coordinates of respective pixel dots in the image on the display screen) according to the position information before and after of the change in position of the viewer, and usually enlarges the image by taking the picture center as a reference, since a subject of a picture is generally at the center of the picture. The enlarged image is transmitted to a video signal generating module 132. When the position information is the position coordinates of the viewer and the display screen, the image enlarging module 131 calculates the distances between the viewer and the display screen according to the position coordinates under the space coordinate system. The image enlarging module 131 calculates an enlarging factor for enlarging the image according to a following equation:

$$A = k \cdot D1/D2$$

wherein, A is an enlarging factor, k is an enlarging coefficient and is a constant larger than 1, which depends on a size of the display screen and an enlarging rate acceptable by the viewer and is usually set in a memory of the image enlarging module 131, D1 represents a distance of the viewer with respect to the display screen before the change in position of the viewer, D2 represents a distance of the viewer with respect to the display screen after the change in position of the viewer.

The image enlarging module 131 transmits the enlarged image to the video signal generating module 132. The video signal generating module 132 generates a new video signal according to the enlarged image.

After the image is enlarged, the image processing means 13 may keep the enlarged image being displayed on the display screen for a period of time and then restore a normal display, or the image enlarging module 131 may stop enlarging the image to restore the normal display when the position measuring means 2 detects that the viewer returns back. However, it can not ensure that the image to be viewed by the viewer can return to the normal display when the video signal is switched to an picture of next frame. Therefore, the image processing means 13 further comprises: an image restoring module for receiving the video signal input from the video signal input means 11, judging a similarity between pictures of two adjacent frames, and transmitting a signal indicating stopping enlarging to the image enlarging module 131 when the similarity is lower than a predetermined threshold, such as 70% (which means the picture has obviously changed), the image enlarging module 131 transmits the video signal directly to the video signal output means 12 as it was.

The apparatus for adjusting the displayed picture can enlarge the image with taking the picture center as a reference in real time when the viewer moves forward or tilts his/her body forward, such that the viewer can view the displayed picture more clearly, thus achieving an interaction between the displayed picture and the viewer.

Second Embodiment

Figure 2:
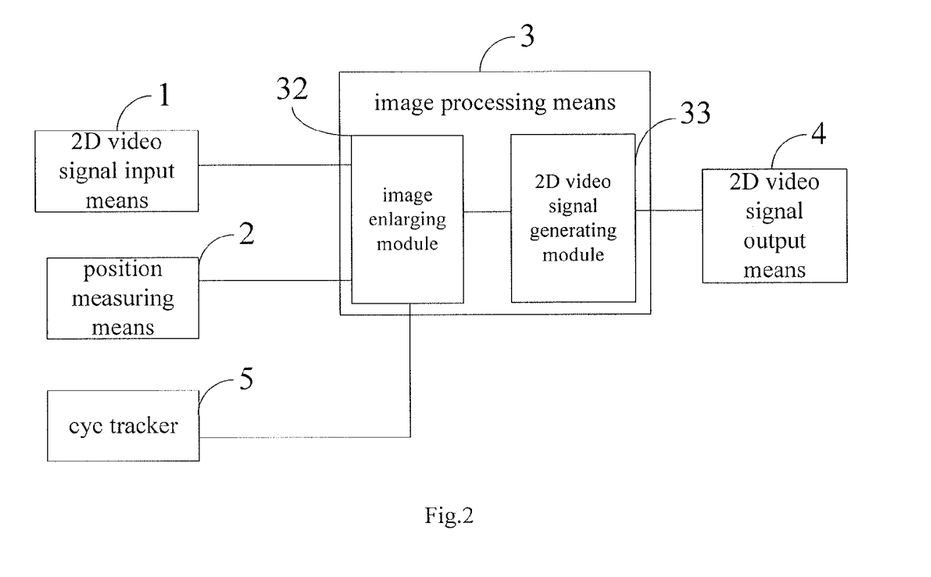
FIG. 2 is a schematic diagram of a structure of an apparatus for adjusting a displayed picture according to a second embodiment of the present disclosure.

The apparatus for adjusting a displayed picture in the first embodiment only can perform enlarging by taking the picture center as a reference, and as a result, image at sides of the picture may be hidden behind a boundary of the display screen. However, sometimes the center of the picture is not the viewpoint of the viewer, so the user experience of the apparatus for adjusting the displayed picture in the first embodiment is poor. In order to achieve a better user experience, a structure of the apparatus for adjusting the displayed picture of the present embodiment (that is, the second embodiment) is as shown in FIG. 2, and the apparatus for adjusting the displayed picture of the present embodiment comprises a 2D video signal input means 1, a position measuring means 2, an image processing means 3, an eye tracker 5 and a 2D video signal output means 4. The 2D video signal input means 1, the position measuring means 2, the eye tracker 5 and the 2D video signal output means 4 are all connected to the image processing means 3.

The 2D video signal input means 1 transmits an acquired 2D video signal to the image processing means 3. The 2D video signal input means 1 may be transmission interfaces of various types capable of transmitting 2D video signal.

The position measuring means 2 transmits position information of a viewer with respect to a display screen collected before and after a change in position of the viewer (the viewer moves forward or tilts his/her body forward, taking the position of the head of the viewer as a measurement) to the image processing means 3. The data collecting rate is generally at 55~65 Hz, that is, about 60 Hz. In the present embodiment, the position measuring means 2 comprises but is not limited to a camera, an infrared sensor or means for inputting position information manually. Wherein, the position information before and after the change in position of the viewer may be coordinates of the viewer and the display screen under a current space coordinate system, and may also be distances between the viewer and the display screen. For example, the camera collects position coordinates of the viewer and the display screen under the space coordinate system, and transmits data of the position coordinates to the image processing means 3; or an operation module in the camera calculates the distances between the viewer and the display screen according to the position coordinates of the viewer and the display screen under the space coordinate system, and transmits data of the distances to the image processing means 3. Meanwhile, the image processing means 3 acquires information of position being concerned by eyes on the display screen when the viewer changes his position, wherein the information is recorded by the eye tracker 5.

The image processing means 3 enlarges a partial image at the position being concerned in the image of the picture of the 2D video signal according to the position information before and after the change in position of the viewer, and transmits the 2D video signal having the partial image enlarged to the 2D video signal output means 4. The 2D video signal output means 4 may be transmission interfaces of various types capable of transmitting 2D video signal.

In the present embodiment, the image processing means may be an embedded chip system composed of a MCU, a FPGA, a PLCD and the like. The image processing means 3 may particularly comprise an image enlarging module 32 and a 2D video signal generating module 33.

The image enlarging module 32 enlarges a partial image, at the position being concerned on the display screen, among the image of the 2D video signal (the 2D video signal comprises the image to be displayed per se and coordinates of respective pixel dots in the image on the display screen) according to the position information before and after of the change in position of the viewer, and can enlarge the partial image by taking the position being concerned by the viewer as a center. The picture having the partial image enlarged is transmitted to the 2D video signal generating module 33. When the position information is the position coordinates of the viewer and the display screen, the image enlarging module 32 calculates the distances between the viewer and the display screen according to the position coordinates of the viewer and the display screen under the space coordinate system. The image enlarging module 32 calculates an enlarging factor for enlarging the partial image at the position being concerned according to a following equation:

$$A = k \cdot D1/D2$$

wherein, A is an enlarging factor, k is an enlarging coefficient and is a constant larger than 1, k depends on a size of the display screen and an enlarging rate acceptable by the viewer and is usually set in a memory of the image enlarging module 32, D1 represents a distance of the viewer with respect to the display screen before the change in position of the viewer, D2 represents a distance of the viewer with respect to the display screen after the change in position of the viewer.

The image enlarging module 32 transmits the picture having the partial image enlarged to the 2D video signal generating module 33. The 2D video signal generating module 33 generates a new 2D video signal according to the picture having the partial image enlarged.

When the position being concerned by the viewer is close to an edge of the display screen, enlarging the partial image may cause the enlarged partial image exceeds the boundary of the display screen. Furthermore, the image processing means 3 further comprises a boundary judging module being connected to the image enlarging module 32 and the 2D video signal generating module 33. The boundary judging module adjusts the enlarged partial image to be in a display area of the display screen when the enlarged partial image exceeds the boundary of the display screen, and transmits the picture having the position of the enlarged partial image adjusted to the 2D video signal generating module 33.

After the partial image is enlarged, the image processing means 3 may keep the enlarged image being displayed on the display screen for a period of time and then restore a normal display, or the image enlarging module 32 may stop enlarging the image to restore the normal display when the position measuring means 2 detects that the viewer returns back. However, it can not ensure that the partial image to be viewed by the viewer can return to the normal display when the video signal is switched to a picture of the next frame. Therefore, the image processing means 3 further comprises: an image restoring module for receiving the video signal input from the 2D video signal input means 1, judging a similarity between pictures of two adjacent frames in real time, and transmitting a signal indicating stopping enlarging to the image enlarging module 32 when the similarity is lower than a predetermined threshold, such as 70% (which means the picture has obviously changed), the image enlarging module 32 transmits the video signal directly to the 2D video signal output means 4 as it was.

The apparatus for adjusting the displayed picture in the present embodiment can enlarge the partial image at the position being concerned by eyes on the display screen in real time when the viewer moves forward or tilts his/her body forward, such that the viewer can view the displayed picture more clearly, thus achieving an interaction between the displayed picture and the viewer.

Third Embodiment

Figure 3:
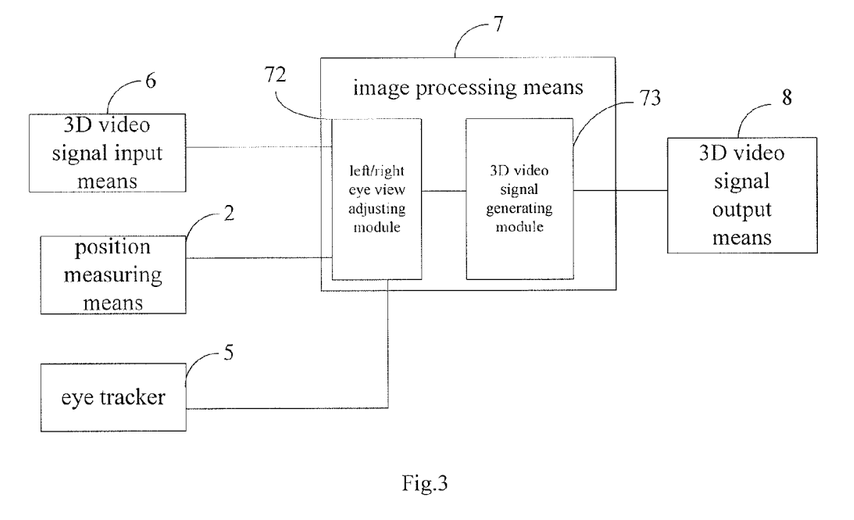
FIG. 3 is a schematic diagram of a structure of an apparatus for adjusting a displayed picture according to a third embodiment of the present disclosure.

A structure of the apparatus for adjusting a displayed picture of the present embodiment (that is, the third embodiment) is as shown in FIG. 3, and the apparatus for adjusting the displayed picture of the present embodiment comprises a 3D video signal input means 6, a position measuring means 2, an image processing means 7, an eye tracker 5 and a 3D video signal output means 8. The 3D video signal input means 6, the position measuring means 2, the eye tracker 5 and the 3D video signal output means 8 are all connected to the image processing means 7.

The 3D video signal input means 6 transmits an acquired 3D video signal to the image processing means 7. The 3D video signal input means 6 may be transmission interfaces of various types capable of transmitting 3D video signal.

The position measuring means 2 transmits position information of a viewer with respect to a display screen collected before and after a change in position of the viewer (the viewer moves forward or tilts his/her body forward, taking the position of the head of the viewer as a measurement) to the image processing means 7. The data collecting rate is generally at 55~65 Hz, that is, about 60 Hz. In the present embodiment, the position measuring means 2 comprises but is not limited to a camera, an infrared sensor or means for inputting position information manually. Wherein, the position information before and after the change in position of the viewer may be coordinates of the viewer and the display screen under the space coordinate system, and may also be distances between the viewer and the display screen. For example, the camera collects position coordinates of the viewer and the display screen under the space coordinate system, and transmits data of the position coordinates to the image processing means 7; or an operation module in the camera calculates the distances between the viewer and the display screen according to the position coordinates of the viewer and the display screen under the space coordinate system, and transmits data of the distance to the image processing means 7. Meanwhile, the image processing means 7 acquires the information of position being concerned by eyes on the display screen when the viewer changes his position, wherein the information is recorded by the eye tracker 5.

Left/right eye views (left eye view and right eye view) included in the 3D video signal should be enlarged simultaneously as being enlarged. Therefore, the image processing means 7 enlarges partial images at the position being concerned in left/right eye views in the 3D video signal according to the position information before and after the change in position of the viewer, and particularly enlarges the partial images with taking the position being concerned by the viewer as a center. The 3D video signal output means 8 outputs the 3D video signal having the partial images in left/right eye views enlarged. The 3D video signal output means 8 may be transmission interfaces of various types capable of transmitting 3D video signal.

In the present embodiment, the image processing means 7 may be an embedded chip system composed of a MCU, a FPGA, a PLCD and the like. The image processing means 7 may particularly comprise a left/right eye view adjusting module 72 and a 3D video signal generating module 73.

The left/right eye view adjusting module 72 enlarges the partial images at the position being concerned in left/right eye views in the 3D video signal according to the position information before and after the change in position of the viewer, and transmits the left/right eye views having the partial images enlarged to the 3D video signal generating module 73. When the position information is the position coordinates of the viewer and the display screen, the left/right eye view adjusting module 72 calculates the distances between the viewer and the display screen according to the position coordinates of the viewer and the display screen under the space coordinate system. The left/right eye view adjusting module 72 calculates an enlarging factor for enlarging the partial images at the position being concerned according to a following equation:

$$A = k \cdot D1/D2$$

wherein, A is an enlarging factor, k is an enlarging coefficient and is a constant larger than 1, which depends on a size of the display screen and an enlarging rate acceptable by the viewer and is usually set in a memory of the left/right eye view adjusting module 72, D1 represents a distance of the viewer with respect to the display screen before the change in position of the viewer, D2 represents a distance of the viewer with respect to the display screen after the change in position of the viewer.

The left/right eye view adjusting module 72 transmits the left/right eye views having the partial images enlarged to the 3D video signal generating module 73. The 3D video signal generating module 73 generates a new 3D video signal according to the left/right eye views having the partial images enlarged.

Figure 4:
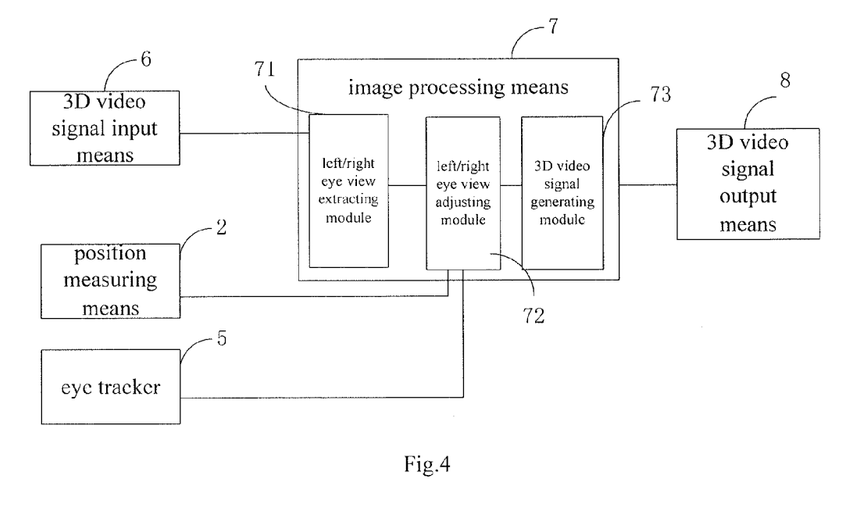
FIG. 4 is a schematic diagram of another structure of an apparatus for adjusting a displayed picture according to the third embodiment of the present disclosure.

Since the left/right eye views may be transmitted as a same picture in the existing 3D video signal, it is necessary to split the left/right eye views from the picture. Therefore, the apparatus for adjusting the displayed picture according to the present embodiment further comprises a left/right eye view extracting module 71. As shown in FIG. 4, the left/right eye view extracting module 71 receives the 3D video signal input from the 3D video signal input means 6 and transmits left/right eye views extracted from the 3D video signal to the left/right eye view adjusting module 72. The left/right eye view extracting module 71 comprises a sampling sub module and a splitting sub module, the sampling sub module is used for sampling a frame of data in the 3D video signal and transmitting the frame of data to the splitting sub module; the splitting sub module is used for splitting the left/right eye views from the frame of data and transmitting the split left/right eye views to the left/right eye view adjusting module 72.

When the position being concerned by the viewer is close to an edge of the display screen, enlarging the partial images may cause the enlarged partial images exceed a boundary of the display screen. Furthermore, the image processing means 7 further comprises a boundary judging module being connected to the left/right eye view adjusting module 72 and the 3D video signal generating module 73. The boundary judging module adjusts the enlarged partial images to be in a display area of the current display screen when the enlarged partial images exceed the boundary of the display screen, and transmits the pictures having the position of the enlarged partial images adjusted to the 3D video signal generating module 73.

After the partial image is enlarged, the image processing means 7 may keep the left/right eye views having the partial images enlarged being displayed on the display screen for a period of time and then restore a normal display, or the left/right eye view adjusting module 72 may stop enlarging the left/right eye views so as to restore the normal display when the position measuring means 2 detects that the viewer returns back. However, it can not ensure that the partial images to be viewed by the viewer can return to the normal display when the video signal is switched to a picture of the next frame. Therefore, the image processing means 7 further comprises: an image restoring module for receiving the video signal input from, the 3D video signal input means 6, judging a similarity between left eye views (or right eye views) of two adjacent frames in real time, and transmitting a signal indicating stopping enlarging to the left/right eye view adjusting module 72 when the similarity is lower than a predetermined threshold, such as 70% (which means the picture has obviously changed), the left/right eye view adjusting module 72 transmits the video signal directly to the 3D video signal output means 8 as it was.

The apparatus for adjusting the displayed picture in the present embodiment can enlarge the partial image at the position being concerned by eyes on the display screen in real time when the viewer moves forward or tilts his/her body forward, such that the viewer can view the displayed picture more clearly, thus achieving an interaction between the displayed picture and the viewer.

Fourth Embodiment

A basic principle of a 3D display is that "a disparity generates a perceive of stereoscopic", that is, the left eye of the viewer only views a left eye image, while a right eye of the viewer only views a right eye image. The left eye image and the right eye image are obtained by taking photos for a certain space scene from two angles, and are called as a stereo image pair. Human brain can merge the two images together, such that 3D effect can be achieved.

Figure 5:
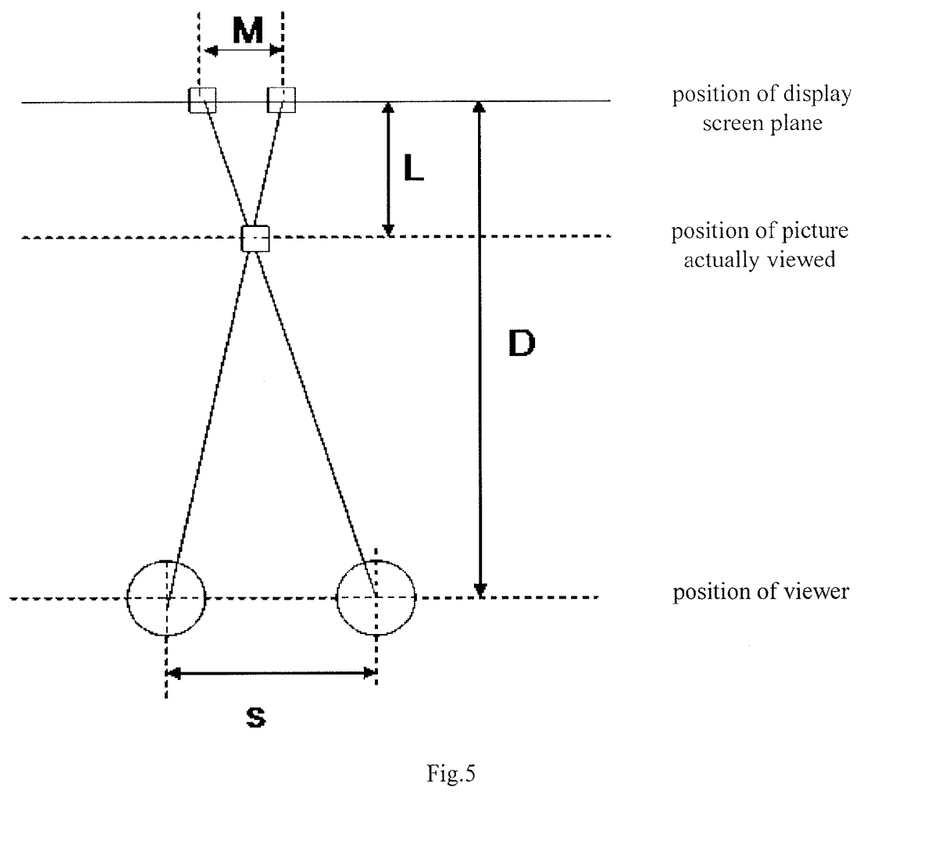
FIG. 5 is a principle diagram illustrating how a viewer perceives the 3D display.

Method for human eyes judging a field depth of displayed contents can be explained with reference to FIG. 5. Two circles with a distance of S at the position of the viewer represent left eye and right eye of the viewer respectively, wherein S is a pupil distance of the viewer. Two squares at the positions of the display screen plane represent the right eye view and the left eye view of an object respectively, which are viewed by the right eye and the left eye of the viewer respectively. After such stereo imaging, the viewer's brain may consider that the object actually locates at a position distancing from the screen plane by L, the distance L is the field depth, D is a viewing distance of the viewer, and M is a distance for the respective pixel dots when the left/right eye views are displayed on the display screen after the change in position of the viewer. So, according to the above figure, it is easy to obtain a following equation:

$$\frac{M}{S} = \frac{L}{D-L}$$

Therefore, for a 3D display screen, partial images may be not enlarged, and the same effect as that achieved by enlarging the partial images can also be achieved by a manner of increasing field depth (that is, making the picture actually viewed by the viewer closer to the viewer, thus the details being viewed more clearly).

Figure 6:
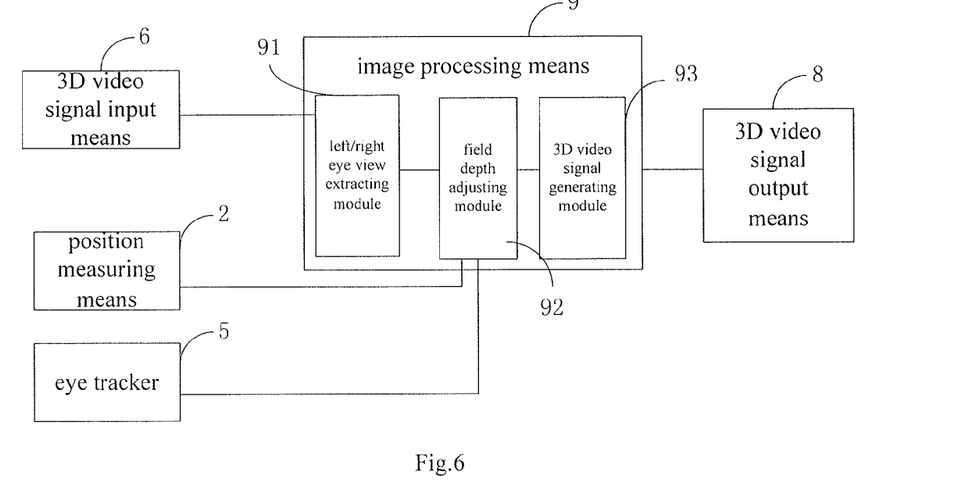
FIG. 6 is a schematic diagram of a structure of an apparatus for adjusting a displayed picture according to a fourth embodiment of the present disclosure.

A structure of the apparatus for adjusting the displayed picture in the present embodiment (that is, the fourth embodiment) is as shown in FIG. 6, and the apparatus for adjusting the displayed picture in the present embodiment comprises a 3D video signal input means 6, a position measuring means 2, an image processing means 9, an eye tracker 5 and a 3D video signal output means 8. The 3D video signal input means 6, the position measuring means 2, the eye tracker 5 and the 3D video signal output means 8 are all connected to the image processing means 9.

The 3D video signal input means 6 transmits an acquired 3D video signal to the image processing means 9. The 3D video signal input means 6 may be transmission interfaces of various types capable of transmitting 3D video signal.

The position measuring means 2 transmits position information of a viewer with respect to a display screen collected before and after a change in position of the viewer (the viewer moves forward or tilts his/her body forward, taking the position of the head of the viewer as a measurement) to the image processing means 9. The data collecting rate is generally at 55~65 Hz, that is, about 60 Hz. In the present disclosure, the position measuring means 2 comprises but is not limited to a camera, an infrared sensor or means for inputting position information manually. Wherein, the position information before and after the change in position of the viewer may be coordinates of the viewer and the display screen under the space coordinate system, and may also be distances between the viewer and the display screen. For example, the camera collects position coordinates of the viewer and the display screen under the space coordinate system, and transmits data of the position coordinates to the image processing means 9; or an operation module in the camera calculates the distance between the viewer and the display screen according to the position coordinates of the viewer and the display screen under the space coordinate system, and transmits data of the distances to the image processing means 9. Meanwhile, the image processing means 9 acquires information of position being concerned by eyes on the display screen when the viewer changes his position, wherein the information is recorded by the eye tracker 5.

The image processing means 9 adjusts a distance for respective pixel dots corresponding to the position being concerned in left/right eye views in the 3D video signal according to the position information before and after the change in position of the viewer so as to increase the field depth of the position being concerned, such that the field depth of the partial images may be adjusted with taking the position being concerned by the viewer as a center. That is, the field depth of the partial images is more protrusive, and becomes closer to the viewer. The adjusted 3D video signal is transmitted to the 3D video signal output means 8. The 3D video signal output means 8 may be transmission interfaces of various types capable of transmitting 3D video signal.

In the present embodiment, the image processing means 9 may be an embedded chip system composed of a MCU, a FPGA, a PLCD and the like. The image processing means 9 may particularly comprise a field depth adjusting module 92 and a 3D video signal generating module 93.

The field depth adjusting module 92 adjusts the distance among the respective pixel dots corresponding to the position being concerned in the left/right eye views in the 3D video signal according to the position information before and after the change in position of the viewer so as to increase the field depth of the position being concerned, and transmits the left/right eye views having the distance among the respective pixel dots corresponding to the position being concerned adjusted to the 3D video signal generating module 93. When the position information is the position coordinates of the viewer and the display screen, the field depth adjusting module 92 calculates the distances between the viewer and the display screen according to the position coordinates of the viewer and the display screen under the space coordinate system. The field depth adjusting module 92 adjusts the field depth of the position being concerned according to a following equation:

$$L2 = L1 \cdot f \cdot D1/D2$$

$$M = \frac{S \cdot L2}{D2 - L2}$$

wherein, D1 represents a distance of the viewer with respect to the display screen before the change in position of the viewer, D2 represents a distance of the viewer with respect to the display screen after the change in position of the viewer, L1 represents the field depth before the change in position of the viewer, D2 represents the field depth after the change in position of the viewer, f is an enlarging coefficient and is a constant larger than 1, which depends on a size of the display screen and an enlarging rate acceptable by the viewer and is usually set in the memory of the field depth adjusting module 92, M is the distance for the respective pixel dots when the left/right eye views are displayed on the display screen after the change in position of the viewer, S is the pupil distance of the viewer.

The field depth adjusting module 92 transmits the left/right eye views having the distance for the respective pixel dots corresponding to the position being concerned adjusted to the 3D video signal generating module 93. The 3D video signal generating module 93 generates a new 3D video signal according to the left/right eye views having the distance for the respective pixel dots corresponding to the position being concerned adjusted.

Since the left/right eye views may be transmitted as a same picture in the existing 3D video signal, it is necessary to split the left/right eye views from the picture. Therefore, the apparatus for adjusting the displayed picture according to the present embodiment further comprises a left/right eye view extracting module 91. As shown in FIG. 6, the left/right eye view extracting module 91 receives the 3D video signal input from the 3D video signal input means 6 and transmits left/right eye views extracted from the 3D video signal to the field depth adjusting module 92. The left/right eye view extracting module 91 comprises a sampling sub module and a splitting sub module, the sampling sub module is used for sampling a frame of data in the 3D video signal and transmitting the frame of data to the splitting sub module; the splitting sub module is used for splitting the left/right eye views from the frame of data and transmitting the split left/right eye views to the field depth adjusting module 92.

After the field depth of the partial images is increased, the image processing means 9 may keep the left/right eye view having the field depth of the partial images enlarged being displayed on the display screen for a period of time and then restore a normal display, or the field depth adjusting module 92 may stop adjusting the distance for the corresponding pixel dots in the left/right eye views when the position measuring means 2 detects that the viewer returns back and restore the normal display. However, it can not ensure that the partial images to be viewed by the viewer can return to the normal display when the video signal is switched to a picture of the next frame. Therefore, the image processing means 9 further comprises: an image restoring module for receiving the video signal input from the 3D video signal input means 6, judging a similarity between left eye views (or right eye views) of two adjacent frames in real time, and transmitting a signal indicating stopping enlarging the field depth to the field depth adjusting module 92 when the similarity is lower than a predetermined threshold, such as 70% (which means the picture has obviously changed), the field depth adjusting module 92 transmits the video signal directly to the 3D video signal output means 8 as it was.

The apparatus for adjusting the displayed picture in the present embodiment can increase the field depth of the position being concerned by eyes on the display screen when the viewer moves forward or tilts his/her body forward, in order to achieve the same effect as that achieved by enlarging the partial images, such that the viewer can view the displayed picture more clearly, thus achieving an interaction between the displayed picture and the viewer. As compared with the second embodiment, the image surrounding the partial image would not be covered due to the enlarging of the partial images, the viewer can still view all of the picture and the display effect is better.

In the apparatus for adjusting the displayed picture according to the embodiments of the present disclosure, the image processing means comprises one or more of the above described image processing means 3, the above described image processing means 7 and above described image processing means 9, thus achieving 2D adjustment, 3D adjustment, and adjustment in various of enlarging manners.

Fifth Embodiment

Figure 7:
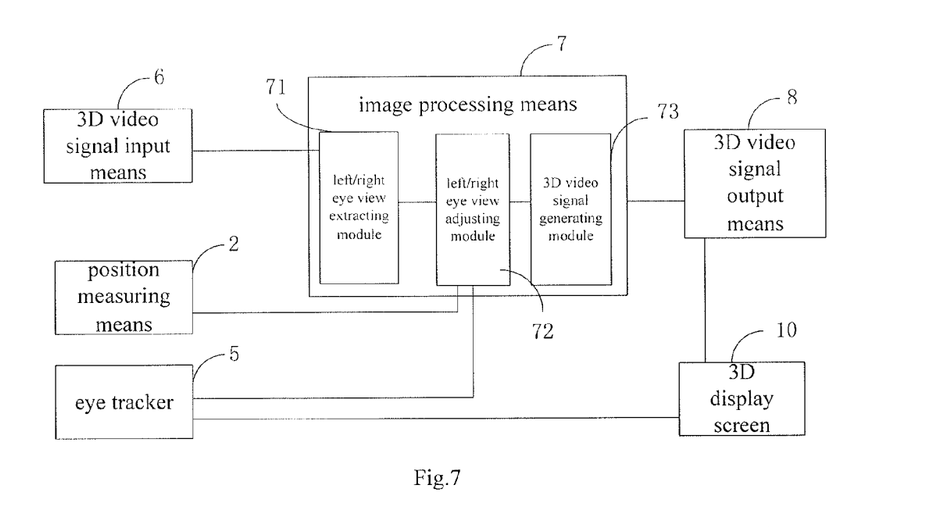
FIG. 7 is a schematic diagram of a structure of a 3D display apparatus according to a fifth embodiment of the present disclosure.

A display apparatus of the present embodiment comprises a 3D display screen 10 and the apparatus for adjusting the displayed picture according to the above described first embodiment, second embodiment, or third embodiment. As illustrated in FIG. 7, by making the apparatus for adjusting the displayed picture according to the second embodiment, both the video signal output means 8 and the eye tracker 5 of the apparatus for adjusting the displayed picture are connected to the 3D display screen 10, the eye tracker 5 transmits the coordinate information of the position being concerned on the 3D display screen collected when the viewer changes his position to the image processing means 7. The video signal output means 8 transmits the adjusted video signal to the display screen 10 for display.

In an example, the 3D display screen comprises a shutter glass 3D display screen, a pattern retarder 3D display screen (also called as an unflicker 3D display screen), a parallax barrier 3D display screen, a lenticular 3D display screen, or a directional backlight 3D display screen.

Sixth Embodiment

Figure 8:
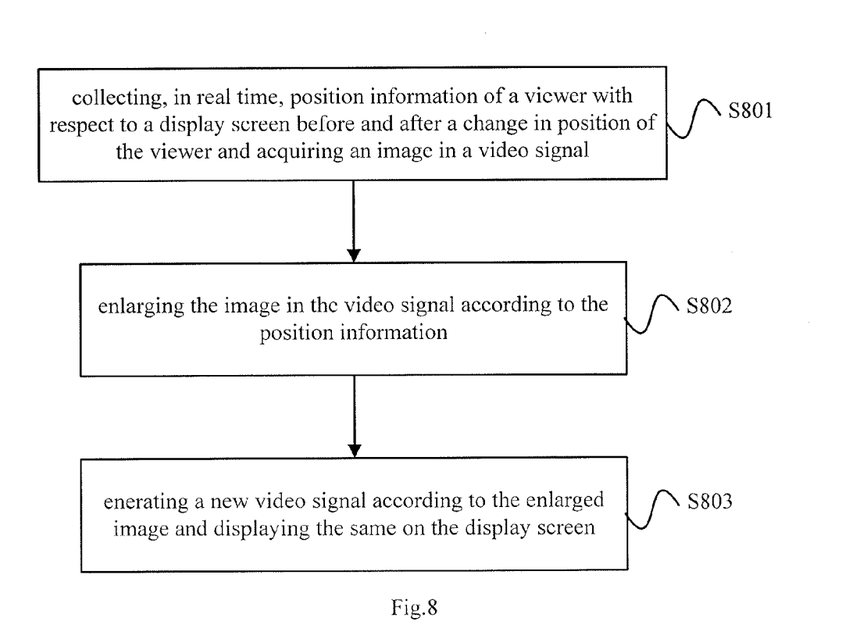
FIG. 8 is a flowchart of a display method according to a sixth embodiment of the present disclosure.

Embodiments of the present disclosure further provide a display method. As shown in FIG. 8, the method comprises the following steps.

In step S801, position information of a viewer with respect to a display screen is collected in real time before and after a change in position of the viewer, and a picture in a video signal is acquired.

Particularly, the position information of the viewer with respect to the display screen may be collected by a camera, an infrared sensor or means for inputting position information manually. The position information may be coordinates of the viewer and the display screen under the current space coordinate system, and may also be distances between the viewer and the display screen. For example, the camera collects position coordinates of the viewer and the display screen under the space coordinate system. Or an operation module in the camera calculates the distances between the viewer and the display screen according to the position coordinates of the viewer and the display screen under the space coordinate system. The data collecting rate is generally at 55~65 Hz, that is, about 60 Hz.

As for a 3D signal, the 3D video signal usually comprises left/right eye views (left eye view and right eye view) and an initial distance therebetween when respective pixel dots are displayed. When the left/right eye views in the 3D video signal are transmitted as a same picture, a frame of data in the 3D video signal is sampled; and the left/right eye views are split from the frame of data.

In step S802, the picture in the video signal is enlarged according to the position information. The enlarging may be performed by taking the center of the picture as a reference and may be performed according to a following equation:

$$A = k \cdot D1/D2.$$

Wherein, A is an enlarging factor, k is an enlarging coefficient and is a constant larger than 1, D1 represents a distance of the viewer with respect to the display screen before the change in position of the viewer, D2 represents a distance of the viewer with respect to the display screen after the change in position of the viewer.

After applying the above equation, image at sides of the picture may be hidden behind a boundary of the display screen. Moreover, sometimes the picture center may be not a view point of the viewer, thus rendering user experience is poor. In order to achieve a better user experience, in the step S801, the eye tracker collects information on the position being concerned by the viewer's eyes on the display screen when the position of the viewer with respect to the display screen changes. Then, only partial images near the position being concerned are enlarged as the enlarging is performed.

When the video signal is a 2D video signal, an enlarging factor is calculated in a following equation according to the position information, and a partial image at the position being concerned in the picture in the video signal is enlarged by the enlarging factor, $$A = k \cdot D1/D2,$$

wherein, A is an enlarging factor, k is an enlarging coefficient and is a constant, D1 represents a distance of the viewer with respect to the display screen before the change in position of the viewer, D2 represents a distance of the viewer with respect to the display screen after the change in position of the viewer.

When the video signal is a 3D video signal, an enlarging factor is calculated in a following equation according to the position information, and partial images at the position being concerned in left/right eye views in the 3D video signal are enlarged by the enlarging factor, respectively.

$$A = k \cdot D1/D2,$$

wherein, A is an enlarging factor, k is an enlarging coefficient and is a constant, D1 represents a distance of the viewer with respect to the display screen before the change in position of the viewer, D2 represents a distance of the viewer with respect to the display screen after the change in position of the viewer.

If the position being concerned by the viewer is close to an edge of the display screen, enlarging the partial images may cause the enlarged partial images exceed a boundary of the display screen. In order to achieve a better viewing effect, in the step S802, after the partial image is enlarged, the method further comprises: judging whether the enlarged partial image exceeds the boundary of the display screen; and adjusting the enlarged partial image to be in the display area of the display screen when it is judged that the enlarged partial image exceeds the boundary of the display screen.

As for the 3D video signal, the same effect as that achieved by enlarging the partial images can also be achieved by a manner of increasing a field depth. A distance for the respective pixel dots corresponding to the position being concerned in the left/right eye views in the 3D video signal is adjusted by a following equation according to the position information, such that the field depth of the position being concerned is increased:

$$L2 = L1 \cdot f \cdot D1/D2$$

$$M = \frac{S \cdot L2}{D2 - L2}$$

wherein, D1 represents a distance of the viewer with respect to the display screen before the change in position of the viewer, D2 represents a distance of the viewer with respect to the display screen after the change in position of the viewer, L1 represents the field depth before the change in position of the viewer, D2 represents the field depth after the change in position of the viewer, f is an enlarging coefficient and is a constant, M is the distance for the respective pixel dots when the left/right eye views are displayed on the display screen after the change in position of the viewer, S is the pupil distance of the viewer. When the viewer moves forwards or tilts his/her body forward, D2<D1, therefore L2>L1.

In step S803, a new video signal is generated according to the above described enlarged image and is displayed on the display screen.

After the picture is enlarged, the partial image is enlarged or the field depth of the partial images is increased, the enlarged image is kept being displayed on the display screen for a period of time and then a normal display is restored, or the enlarging or adjusting of the field depth may be stopped when the position measuring means 2 detects that the viewer returns back and the normal display is restored. However, it can not ensure that the partial images to be viewed by the viewer can return to the normal display when the video signal is switched to a picture of the next frame. Therefore, after step S803, the method further comprises: judging a similarity between pictures of two adjacent frames in real time, and stopping enlarging the picture/partial image or increasing the field depth when the similarity is lower than a predetermined threshold, and transmitting the video signal directly to the display screen for display as it was.

In the display method of the present embodiment, the position being concerned by the viewer's eyes on the display screen is enlarged or the field depth of the position being concerned by the viewer's eyes on the display screen is increased when the viewer moves forward or tilts his/her body forward, such that the viewer can view the displayed picture more clearly, thus achieving an interaction between the displayed picture and the viewer.

The above descriptions are only for illustrating the embodiments of the present disclosure, and in no way limit the scope of the present disclosure. It will be obvious that those skilled in the art may make modifications, variations and equivalences to the above embodiments without departing the spirit and scope of the present disclosure as defined by the following claims. Such variations and modifications are intended to be comprised within the spirit and scope of the present disclosure.

What is claimed is:

1. An apparatus for adjusting a displayed picture, comprising a video signal input means, a position measuring means, an image processing means and a video signal output means, wherein the video signal input means, the position measuring means and the video signal output means are all connected to the image processing means;

the video signal input means is used for transmitting an acquired video signal to the image processing means;

the position measuring means transmits position information of a viewer with respect to a display screen collected before and after a change in position of the viewer;

the image processing means adjusts the video signal according to the position information before and after the change in position of the viewer to enlarge the image in the video signal, and transmits the adjusted video signal to the video signal output means, wherein the position information before and after the change in position of the viewer is coordinates of the viewer and the display screen under a current space coordinate system, or a distance between the viewer and the display screen.

2. The apparatus for adjusting the displayed picture of claim 1, further comprising an eye tracker for detecting information of position being concerned by eyes on the display screen and transmitting the information of position being concerned to the image processing means.

3. The apparatus for adjusting the displayed picture of claim 2, wherein the image processing means comprises:

an image enlarging module for enlarging a partial image at the position being concerned in the video signal according to the position information before and after the change in position of the viewer and transmitting a picture having the partial image enlarged to a video signal generating module; and the video signal generating module for generating a new video signal according to the picture having the partial image enlarged and transmitting the new video signal to the video signal output means.

4. The apparatus for adjusting the displayed picture of claim 3, wherein the image processing means further comprises: a boundary judging module for adjusting the enlarged partial image to be in a display area of the display screen when the enlarged partial image exceeds a boundary of the display screen and transmitting a picture having the position of the enlarged partial image adjusted to the video signal generating module.

5. The apparatus for adjusting the displayed picture of claim 2, wherein the image processing means comprises:

a left/right eye view enlarging module for enlarging partial images at the position being concerned in left/right eye views in a 3D video signal according to the position information before and after the change in position of the viewer and transmitting the left/right eye views having the partial images enlarged to a 3D video signal generating module; and the 3D video signal generating module for generating a new 3D video signal according to the left/right eye views having the partial images enlarged and transmitting the new 3D video signal to the video signal output means.

6. The apparatus for adjusting the displayed picture of claim 5, wherein the image processing means further comprises a left/right eye view extracting module for receiving the 3D video signal and transmitting the left/right eye views extracted from the 3D video signal to the left/right eye view enlarging module.

7. The apparatus for adjusting the displayed picture of claim 6, wherein the left/right eye view extracting module comprises:

a sampling sub module for sampling a frame of data in the 3D video signal and transmitting the frame of data to a splitting sub module; and the splitting sub module for splitting the left/right eye views from the frame of data and transmitting the split left/right eye views to the left/right eye view enlarging module.

8. The apparatus for adjusting the displayed picture of claim 2, wherein the image processing means comprises:

a field depth adjusting module for adjusting a distance for respective pixel dots corresponding to the position being concerned in the left/right eye views in the 3D video signal according to the position information before and after the change in position of the viewer to increase a field depth of the position being concerned, and transmitting the adjusted left/right eye views to a 3D video signal generating module; and the 3D video signal generating module for generating a new 3D video signal according to the adjusted left/right eye views and transmitting the new 3D video signal to the video signal output means.

9. The apparatus for adjusting the displayed picture of claim 8, wherein the image processing means further comprises a left/right eye view extracting module for receiving the 3D video signal and transmitting the left/right eye views extracted from the 3D video signal to the field depth adjusting module.

10. The apparatus for adjusting the displayed picture of claim 9, wherein the left/right eye view extracting module comprises:

a sampling sub module for sampling a frame of data in the 3D video signal and transmitting the frame of data to a splitting sub module;

the splitting sub module for splitting left/right eye views from the frame of data and transmitting the split left/right eye views to the field depth adjusting module.

11. The apparatus for adjusting the displayed picture of claim 1, wherein the image processing means further comprises an image restoring module for receiving the video signal input from the video signal input means, judging a similarity between pictures of two adjacent frames in real time, and transmitting a signal indicating stopping enlarging to the image enlarging module when the similarity is lower than a predetermined threshold, and the image enlarging module transmits the video signal to the video signal output means directly as it was.

12. The apparatus for adjusting the displayed picture of claim 1, wherein the position measuring means comprises a camera, an infrared sensor or means for inputting position information manually.

13. A display apparatus comprising a display screen and an apparatus for adjusting a displayed picture, a video signal output means of the apparatus for adjusting the displayed picture is connected to the display screen, the video signal output means transmits the adjusted video signal to the display screen for display, wherein the apparatus for adjusting a displayed picture comprises the video signal input means, a position measuring means, an image processing means and a video signal output means, wherein the video signal input means, the position measuring means and the video signal output means are all connected to the image processing means, the video signal input means is used for transmitting an acquired video signal to the image processing means;

the position measuring means transmits position information of a viewer with respect to a display screen collected before and after a change in position of the viewer to the image processing means;

the image processing means adjusts the video signal according to the position information before and after the change in position of the viewer to enlarge the image in the video signal, and transmits the adjusted video signal to the video signal output means, and wherein the position information before and after the change in position of the viewer is coordinates of the viewer and the display screen under a current space coordinate system, or a distance between the viewer and the display screen.

14. The display apparatus of claim 13, wherein the display screen comprises a shutter glass 3D display screen, a pattern retarder 3D display screen, a parallax barrier 3D display screen, a lenticular 3D display screen, or a directional backlight 3D display screen.

15. A display method comprising steps of:

step S1, collecting, in real time, position information of a viewer with respect to a display screen before and after a change in position of the viewer, and acquiring an image in a video signal;

step S2, enlarging the image in the video signal according to the position information;

step S3, generating a new video signal according to the enlarged image and displaying the same on the display screen, wherein a position information before and after the change in position of the viewer is coordinates of the viewer and the display screen under a current space coordinate system, or a distance between the viewer and the display screen.

16. The display method of claim 15, wherein the step S1 further comprises acquiring information of position being concerned by eyes of the viewer on the display screen when the change in position of the viewer appears.

17. The display method of claim 16, wherein in the step S1, the position information of the viewer with respect to the display screen is collected by a camera, an infrared sensor or means for inputting position information manually, and the information of position being concerned by eyes of the viewer on the display screen is collected by an eye tracker.

18. The display method of claim 16, wherein the video signal is a 2D video signal, and in the step S2, an enlarging factor is calculated by a following equation according to the position information, and a partial image at the position being concerned in the image in the video signal is enlarged by the enlarging factor, $$A = k \cdot D1/D2$$

wherein, A is an enlarging factor, k is an enlarging coefficient and is a constant larger than 1, D1 represents a distance of the viewer with respect to the display screen before the change in position of the viewer, D2 represents a distance of the viewer with respect to the display screen after the change in position of the viewer.

19. The display method of claim 18, wherein after enlarging the partial image at the position being concerned in step S2, the method further comprises: judging whether the enlarged partial image exceeds a boundary of the display screen; and adjusting the enlarged partial image to be in a display area of the display screen when it is judged that the enlarged partial image exceeds the boundary of the display screen.

20. The display method of claim 16, wherein the video signal is a 3D video signal, and in the step S2, an enlarging factor is calculated by a following equation according to the position information, and partial images at the position being concerned in left/right eye views in the 3D video signal are enlarged by the enlarging factor, respectively, $$A = k \cdot D1/D2$$

wherein, A is an enlarging factor, k is an enlarging coefficient and is a constant larger than 1, D1 represents a distance of the viewer with respect to the display screen before the change in position of the viewer, D2 represents a distance of the viewer with respect to the display screen after the change in position of the viewer.

21. The display method of claim 20, wherein when the left/right eye views in the 3D video signal are transmitted as a same picture, acquiring the picture in the video signal in the step S1 is a step of acquiring the left/right eye views in the 3D video signal and further comprises:

collecting a frame of data in the 3D video signal; and
splitting the left/right eye views from the frame of data.

22. The display method of claim 16, wherein the video signal is a 3D video signal, and in the step S2, a distance for the respective pixel dots corresponding to the position being concerned in the left/right eye views in the 3D video signal is adjusted by a following equation according to the position information, in order to increase a field depth of the position being concerned, $$L2 = L1 \cdot f \cdot D1/D2$$

$$M = \frac{S \cdot L2}{D2 - L2}$$

wherein, D1 represents a distance of the viewer with respect to the display screen before the change in position of the viewer, D2 represents a distance of the viewer with respect to the display screen after the change in position of the viewer, L1 represents a field depth before the change in position of the viewer, D2 represents a field depth after the change in position of the viewer, f is an enlarging coefficient and is a constant larger than 1, M is the distance for the respective pixel dots when the left/right eye views are displayed on the display screen after the change in position of the viewer, S is a pupil distance of the viewer.

23. The display method of claim 16, wherein after the step S3, the method further comprises: judging a similarity between pictures of two adjacent frames;

stopping enlarging the picture when the similarity is lower than a predetermined threshold; and transmitting the video signal directly to the display screen for display as it was.

24. The display method of claim 15, wherein in the step S1, a data collecting rate for collecting the change in position of the viewer is 55 Hz~65 Hz.

* * * * *